United States Patent [19]
Kreill

[11] Patent Number: 5,618,409
[45] Date of Patent: Apr. 8, 1997

[54] CENTRIFUGE FOR THE CONTINUOUS SEPARATION OF SUBSTANCES OF DIFFERENT DENSITIES

[75] Inventor: Walter Kreill, Vilsbiburg, Germany

[73] Assignee: FLottweg GmbH, Vilsbiburg, Germany

[21] Appl. No.: 204,422

[22] PCT Filed: Sep. 16, 1992

[86] PCT No.: PCT/DE92/00790

§ 371 Date: Aug. 12, 1994

§ 102(e) Date: Aug. 12, 1994

[87] PCT Pub. No.: WO93/05884

PCT Pub. Date: Apr. 1, 1993

[30] Foreign Application Priority Data

Sep. 16, 1991 [DE] Germany ............... 41 30 759.7

[51] Int. Cl.⁶ ............................................. F16K 31/64
[52] U.S. Cl. .................. 210/97; 210/149; 210/360.1; 210/369; 210/418; 60/527; 60/529; 251/11; 494/2; 494/4; 494/26; 494/27; 494/56
[58] Field of Search ................. 210/360.1, 369, 210/90, 97, 103, 104, 105, 149, 402, 418, 424; 494/1, 2, 4, 5, 15, 23, 26, 27, 40, 56; 60/527, 529; 251/11, 129.01

[56] References Cited

U.S. PATENT DOCUMENTS

| | | |
|---|---|---|
| 3,729,128 | 4/1973 | Reed . |
| 3,858,794 | 1/1975 | Nilson et al. . |
| 4,836,496 | 6/1989 | Abujudom et al. ................. 60/528 |
| 4,973,024 | 11/1990 | Homma . |
| 5,188,728 | 2/1993 | Traonvoez et al. ................. 210/90 |
| 5,396,769 | 3/1995 | Brudnicki ................. 60/527 |

FOREIGN PATENT DOCUMENTS

| | | |
|---|---|---|
| 0118152 | 9/1984 | European Pat. Off. . |
| 2059318 | 5/1972 | Germany . |
| 3011620 | 10/1981 | Germany . |
| 3009669 | 9/1982 | Germany . |
| 3620912 | 12/1987 | Germany . |
| 3900477 | 7/1990 | Germany . |
| 3921327 | 1/1991 | Germany . |
| 59-103088 | 6/1984 | Japan . |
| 59-197682 | 11/1984 | Japan . |
| 60-23680 | 2/1985 | Japan . |
| 60-146975 | 8/1985 | Japan . |
| 628957 | 9/1978 | U.S.S.R. . |
| 1434163 | 10/1988 | U.S.S.R. . |
| 614501 | 12/1948 | United Kingdom . |

OTHER PUBLICATIONS

US PTO 96–2774; An English Translation of SU 628957.

*Primary Examiner*—David A. Reifsnyder
*Attorney, Agent, or Firm*—Alfred Stapler, Esq.; Lipton & Stapler

[57] ABSTRACT

The centrifuge (1) described has at least one device (11,12) designed to control the operation of the centrifuge, the devices being mounted to rotate with the rotating part of the centrifuge and to be operated by a mechanical actuator (13) also rotating with it. Such devices may, for instance, be drain valves, periodically opening discharge valves, sill height adjustment devices, pressure-control devices, temperature-control devices, etc. At least one part of the devices of this centrifuge to be controlled independently of the centrifugal force is designed so that the rotating actuator (13) changes its shape as a function of the temperature and has at least one temperature-specific shape.

22 Claims, 7 Drawing Sheets

CENTRIFUGE FOR THE CONTINUOUS SEPARATION OF SUBSTANCES OF DIFFERENT DENSITIES

The invention relates to centrifuges for separating substances of different densities, for example, solid-liquid mixtures, with at least one device located for co-rotation with a rotating portion of the centrifuge and controlled by an also co-rotating mechanical actuator for determining the operation, for example, of drain valves, periodically operating discharge valves, sill height adjustment devices, pressure control devices, temperature control devices, and the like.

By operation determined by the controlled devices, there are to be understood externally controlled operating parameters, as these can be affected, for example, by sill height adjustment devices, discharge valves, residue drain valves and the like. Also included is the adjustment of operating conditions, that is control, for example, as a function of the turbidity of the concentrate, or the residual moisture in the solids. Particularly included are sill height adjustment devices, such as radially displaceable sill plates, two consecutively located sill plates of different diameters with controllable intermediate run-off for level reduction, sill plates connected to a controlled valve at greater diameter for lowering the level, outlet valves such as valves for draining sludge or a more or less large fraction of the bowl contents, e.g. closing of the valves while cooling the actuator either through a separate cooling medium or through exiting centrifuged medium, as well as residue discharge valves for the complete emptying or cleaning of the centrifuge, as is appropriate especially for perishable, explosive and/or radio-active materials, and cleaning for product change without stopping the machine. Finally, the prevention of operating stoppages forms part of the purpose of the operation, for which there are used primarily devices for overload protection, such as pressure control devices, for example, for grease expansion in the helix bearings, namely through increase in volume of the grease space by means of piston displacement, or else through relief valves. To prevent operating stoppages there are further used devices for controlling temperature, namely in the separating chamber as exit valves for hot liquid, gases or vapors and in the bearing space through valves for supplying lubricant/cooling liquid from a co-rotating reservoir or from outside the bowl, e.g. upon excessive heating of a bearing due to increased friction. Finally there can be provided devices for protecting against turning moment overload, which can cause interruption of the drive of the helix, e.g. due to friction heating, especially through a disengageable coupling. This listing of the devices for controlling the operation of the centrifuge in relation to the previously mentioned, fundamental purposes, does not purport to exhaust the areas of application of the actuators here under discussion.

The actuation of control devices inside a centrifuge, i.e. at rotating locations, is difficult and complicated to carry out from the outside and indeed is possible only under certain operating conditions. Thus, one can supply a control liquid through a stationary supply pipe, which extends into a circumferential trough (circumferential pockets) of the rotating centrifuge portion and from there exerts a control force, e.g. for operating a piston serving as the actuator of a control device, as a function of the centrifugal force resulting from the rate of rotation of the centrifuge. A control force which is specifically pressure dependent and therefore independent of centrifugal force could be provided by a pressure-transmitting liquid which is ducted through a rotating coupling from a stationary conduit into a rotating conduit, but the pressurized and leakproof rotating coupling is costly—see, for example, German Offenlegungsschrift (DE-OS) 30 09 669.

Thus, for example, to operate residue drain valves—the liquid residue remaining in the drum after separation is desirably removed, e.g. because it is ejected into the solids trough when the centrifuge is stopped or because it makes the cleaning of the drum more difficult—there is utilized the centrifugal force which acts radially upon the valve as a function of the rate of rotation of the centrifuge, and which acts against the force of a radially inward directed spring in such manner that, at the operating rate of rotation, the centrifugal force keeps the valve closed against the spring pressure, while the valve opens during reduction in the rate of rotation—see, for example, British patent (GB-PS) 614 501.

Examples of control by means of a control liquid, which is supplied freely to the centrifuge rotor via annular pockets, are centrifuge bowls with intermittent sludge removal. These are usually provided with valves or tubular slide valves which are controlled from outside during operation by means of the control liquid. Under the influence of the centrifugal force, the control liquid develops high hydraulic pressures which are utilized to operate the valves or tubular slide valves—see, for example, German Offenlegungsschrift (DE-OS) 30 11 620.

For many centrifugeable media, the adjustability of the liquid level in the bowl during operation decisively influences the result of the separation and, in many instances, makes possible the use of decanters in this field. This is particularly true for media with variable composition and solids which are difficult to transport via helix. It is known to use, for such adjustability of the liquid level in the bowl, or rather the liquid depth in the separating chamber of the centrifuge, an adjustable weir plate, but this is very costly and requires higher energy consumption than free flow, especially for larger machines. In many cases, there suffices a sill diameter adjustment of a few millimeters, e.g. during start-up of decanters with so-called Superpool, so that the adjustment range of an adjustable weir plate is not exploited. To prevent breakthrough of the liquid to the solids side, the sill diameter must initially be set to a higher value, and then switched to a smaller sill diameter, i.e. to Superpool, after sufficient buildup of solids before the sill for high dry solids content. Such a decanter is known—see German patent (DE) 37 28 901—with provision for a bypass for the concentrate run-off, so that one or the other of two stationary weir plates is selectively utilized. This apparatus works with a hydraulic tubular slide valve control known from separators.

A disadvantage of these arrangements is the dependence of the operation of the respective device upon the centrifugal force and thus upon the prevailing or intentionally established rate of rotation, and the danger of blockage and dirtying of valves or tubular slide valves through deposits, given the limited, rate-of rotation dependent force differentials for the closing and opening movements, or the high cost of the controls.

The invention has the object of providing centrifuges of the type under discussion whose controllable devices are operated at least in part under a control which is independent of centrifugal force.

Starting with a centrifuge having the initially described characteristics, the object is achieved in accordance with the invention by utilizing, for the control of the respective device, an actuator which changes its shape as a function of temperature, and which exhibits at least one temperature-specific shape.

The use in accordance with the invention of an actuator which changes shape as a function of temperature and has at least one temperature-specific shape for the control of the respective device opens up the possibility of using a new physical control parameter, namely temperature, which is independent of centrifugal force. This control parameter can be applied to the actuator from outside the centrifuge, but it can also be derived from the temperature conditions of the mixture, or of at least one component of the mixture which is to be separated, or of the centrifuge, and used to control the actuator. In the latter case, the actuator itself can simultaneously function as temperature sensor.

The actuator takes on at least one temperature-specific shape, particularly if the temperature to which the actuator is subjected is caused to rise by a predetermined amount through a heated gaseous or liquid medium, or through the mixture, or the centrifuge. In case there occurs the assumption of only a single specific shape as a function of temperature, then an additional force is needed for the return to the other shape (initial state) at temperatures below the switching range, which can be provided by a spring element (e.g. of spring steel) utilized as a shock absorber, or by centrifugal force provided by the rotation of the centrifuge. However it is also possible to construct the actuator so that it reacts to temperature rises with one specific shape and to temperature decreases back to a different shape, in which case one shape transformation can occur with less force development than the opposing one, so that an additional spring or centrifugal force may again be required.

As actuators of this type there can be considered elastic elements, e.g. wax-filled piston-cylinder arrangements, but especially bi-metallic elements and, especially preferred, so-called shape-memory metals.

In a particularly preferred embodiment there are utilized actuators whose shape change takes place within a control temperature range which is small relative to the operating temperature range. This yields a control action, for the devices which are operated by the respective actuator, that resembles a switching action. This is desirable in many cases, especially when a change in operation during start-up or interruption, monitoring or the like should trigger a spontaneous reaction with highest possible force development, so that even dirt or deposits on valves, slide valves or like actuator elements do not cause blockages. Such a switch-like action of the actuator can be provided by a bi-metallic element which exhibits two stable switching states separated by a temperature-dependent deformation toggling value. A particularly preferred usable shape-memory metal also has this switch-like characteristic:

Shape-memory metals—also known as memory alloys—experience within a narrow temperature range a structural transformation (austenite-martensite) and thereby change their shape. Thus the shape-memory metal, or rather the actuator made from it, has a predetermined shape in the austenitic structure, while in contrast the shape-memory metal at lower temperature, e.g. at room temperature, is reconfigured under martensitic structural conditions into a different shape. For the actuators which are used here, this could be designated as the initial configuration. If the actuator having this initial configuration is heated, the structure of the memory metal again becomes austenitic above a certain temperature, whereupon the component reverts almost completely to its original shape. This process of memory capability in response to heating to a predetermined configuration can exist as a one-way effect, i.e. the actuator made of such a one-way memory metal assumes its original shape only upon temperature increase, whereas the reversion to another, namely the above-mentioned initial configuration, must always be brought about by external forces.

There are also memory metals, or memory alloys, with so-called two-way effect, i.e. they assume a specific high temperature configuration as well a specific low temperature configuration, i.e. the shape change is reversible. However, in so doing, the transition to the low temperature shape is generally associated with relatively lower force development, so that reinforcing external influences, such as stored spring forces or centrifugal forces must be applied, in order to accomplish the transition into the low temperature shape. The structural transformation of such memory-metal actuators takes place suddenly when the required temperature conditions are present, so that the speed of shape change is ultimately determined by the rate of heat supply or removal. A further special advantage of these memory metals is their high performance per unit volume, at least in the direction of assuming the shape of the austenitic structure, as well as the possibility of combining sensor and actuator in a single component. There are various memory alloys of the kind under discussion as, for example, copper-zinc-aluminum alloys and nickel-titanium alloys, of which the latter are preferably used in accordance with the invention due to their shape-change properties, the permissible pressure, and above all the corrosion resistance.

In a further preferred embodiment, the one, or one of the actuators connected to the devices which are to be controlled is formed of two or more memory metals arranged in parallel and/or series. Thereby one can increase the force developed during shape change in the parallel connection, or increase the shape change magnitude in the series connection. In both cases, one can also achieve a step-like shape change behavior of the whole so-configured actuator within different shape-changing temperature ranges. In another embodiment, the one, or at least one of the actuators can interconnect two or more which are connected in series and/or parallel and moving in opposite directions due to shape changes resulting from temperature-caused structural changes, so that, in the course of a step-wise temperature increase within appropriately differing shape changing temperature ranges, there can be produced a first switching step, which is then canceled, or modified in a succeeding switching step.

For the restoring force opposing a shape change, which takes place in the transition from the martensite to the austenite state, one can utilize the centrifugal force which varies with the centrifuge rate of rotation for actuators made of one-way memory alloys, as well as by way of reinforcement when using two-way memory alloys. The positioning of the actuator made from such alloys should be such as to act as much as possible in a radial direction, which can be achieved especially for lengthwise acting shape changes of the actuators with respect to devices which are radially actuatable, particularly valves located in the housing region. In another embodiment, and particularly for such stroke-like movements of the actuators which exhibit no, or only a relatively slight radial component, there is required a restoring force in order to shift the actuators into the low temperature shape of the memory-metal, which is preferably done by means of a spring, which is arranged as a shock absorber. Here, too, the use of one-way memory metals can be contemplated, in which case the restoration is carried out entirely by spring forces, or else the use of two-way memory metals, for which the restoration is carried out additionally by the force of a spring. Of course it is also possible to subject to additional forces actuators which are under centrifugal force.

The actuators of memory-metal are preferably in the form of pull-rod, coil spring, torsion bar, or leaf spring.

In order to apply to the actuator a specific control command from outside the centrifuge, there is preferably supplied an appropriate liquid or gaseous heating and/or cooling medium, preferably via a stationary supply pipe which ends in a ring-shaped receiving channel from which the medium is led to the actuator by centrifugal force dependent upon the centrifuge rate of rotation add through radial flow path components, around which it flows, or through which it is conducted.

For the case in which devices, or one or more of all the installed devices are not to be specifically controlled from outside, the respective actuator is so arranged that it simultaneously serves as sensor for the temperatures created by the centrifuge and/or the centrifuge contents. This can be utilized, for example, to determine the temperature change of the respective actuator which occurs upon introduction of cleaning liquid following prior operation with a cold centrifuged medium. The actuator can then open a valve provided in the sidewall region of the bowl and allow the cleaning liquid to flow out. Furthermore the actuator can be subjected to a temperature variation which is due to contact with exiting centrifuge medium. In addition, to prevent leakage-caused overloads of seals in a bearing space, particularly the helix bearing interior, it is possible to use this as a pressure equalization chamber, or to place it in communication with such, whose volume can be increased by means of an actuator in contact with the lubricant in response to a lubricant temperature rise, preferably with the aid of at least one piston extending into a hollow chamber at whose face exposed to the lubricant the actuator—preferably in the form of at least one coil spring shaped memory metal—is located and to whose opposite face a restoring spring is applied.

During centrifuge start-up, the more viscous lubricant has less tendency to escape through the seals; therefore it is desirable to enlarge the bearing space, or the equalization chamber only at a predetermined temperature, which is achieved by the switching action of the memory metal. However, it is more significant that, above a certain temperature dependent pressure, the seals can wear more and be ruptured. By providing several parallel actuators and pistons with staggered temperature dependence, there can be achieved a step-wise enlargement of the chamber volume, or else by constructing one actuator, acting upon one piston, of several memory metals connected in parallel or in series, which exhibit different temperature dependent switching thresholds and thereby displace the piston during rising temperature step-wise in the direction of enlarging the chamber volume.

Preferred applications of the actuators with their accompanying devices result from the following measures: orifices located radially outward in the centrifuge bowl are so arranged that the centrifuge bowl can be emptied through these orifices; the orifices are so arranged in the thick sludge portion of the centrifuge that thick sludge can be periodically evacuated from the centrifuge bowl through these orifices; the orifices are located at a larger diameter than an overflow sill located in the centrifuge bowl, so that, with open orifice, there is created an internal diameter of the liquid level which is greater than the internal diameter established by the overflow sill. In addition, the orifices can be located between two spaced-apart sill plates, the sill plate facing the separating chamber having a greater internal diameter than the other sill plate, so that with open orifice, the liquid's internal diameter is determined by the sill plate with the greater diameter, whereas with closed orifice, it is determined by the sill plate with smaller internal diameter.

On the other hand, actuators which act in the radial direction can be provided, especially if formed as temperature-dependent length-varying rods or hollow rods, which are respectively connected to a radially displaceable sill plate located opposite an accompanying discharge opening.

By these adjustments of the sill heights and therefore pool depths in the separating section of the centrifuge, mixtures which are difficult to separate can be processed more easily, especially sludges or the like, which require the accumulation of a certain amount of solids for the removal of solids to proceed.

In order to ensure the shape change action over an extended period of time, or a multiplicity of shape changes, it is advisable to apply to the memory metals (memory alloys) a restoring force at the moment of transformation from the austenitic to the martensitic state, corresponding to a force of at least 30N/mm. Because it is not certain that, during structural transformation of austenite into martensite, there is created a corresponding centrifugal force which equals that force—a machine of the type under discussion can come to a stop before the structural transformation has occurred—it can be advisable for many applications to build in a force storage means, for example a spring, which provides the appropriate restoring force independently of the centrifugal force. Moreover, components can have memory alloys extending only over portions thereof, so that only predetermined portions of these components take part in the shape change.

Because of their property of uniting sensor and actuator in a single component, actuators of memory metals are particularly advantageously usable when the switching process is not triggered through external heating or external cooling, but directly through the product temperature. In this regard, one can particularly envision self-regulating discharge mechanisms for sludge or concentrate, where the heat of friction created by the exit through narrow nozzles automatically adjusts the discharge cross-section. As an example: a small discharge opening leads to reduced flow, results in heating, causes the transformation into austenite, whereby the discharge opening is enlarged; alternatively the discharge opening is large whereby the throughput is great so that cooling takes place which causes transformation into martensite, whereby the opening is reduced.

The heat supply or the cooling needed for the shape change of the actuators need not necessarily occur through liquid or gaseous heating media in the case of external control, it is also conceivable to utilize for this purpose frictional heat which is produced by the prevailing operation of the machine, thus for example, through adjustment of the difference in rate of rotation between helix and bowl of a decanter, through restriction of the outflow via the adjustable sill plate and so forth. In addition one can conceive using chemicals with endothermic or exothermic reaction for thermal control of the actuators.

In a preferred embodiment, the above-mentioned procedures are applied to scroll conveyor centrifuges, or to drum centrifuges.

Preferred embodiments of the invention appear from the dependent claims, particularly in conjunction with the exemplary embodiments shown in the drawing, whose following description further explains the invention. There are shown in FIG. 1 a longitudinal cross-section taken along the axis of a centrifuge through the head-end lid portion of a centrifuge;

In the examples according to FIGS. 1 to 10 there is assumed in each case a scroll conveyor centrifuge 1 of known construction. This centrifuge has a centrifuge bowl (housing) 2 which is rotatably supported on bearing 8 in a manner not shown and which has a coaxially rotatable helix 3 with hub 4, whose helix turns 5 attached to the hub extend close to the inner wall of centrifuge bowl 2. The centrifuge bowl is provided with a bowl lid 6 at its head-end facing away from the solids outlet (not shown). Between its hub support extending into the interior of the centrifuge and the helix hub 4 at this head-end of the centrifuge, there is a helix bearing 7. Through the hub of the bowl lid 6 there extends a stationary inlet pipe 9 which is held in place in a manner not further illustrated, and through which the mixture to be separated is introduced, in a manner not further illustrated, through an opening in the bowl hub into the separating chamber of the centrifuge which is defined by the inner wall of bowl 2, the outer wall of hub 4, the turns of the helix 5 and the inner wall of the bowl lid 6. The bowl lid 6 is pierced by outlet openings 21 uniformly distributed over its circumference, through which a separated phase of the mixture, particularly a liquid phase of a solid-liquid mixture, exits from the centrifuge. The outlet openings 21 are provided with a sill plate 10, whose inner diameter determines the depth of pool 17 prevailing during operation. The bowl is set into high speed rotation, the helix located inside the bowl rotates at only a slightly lower rate of rotation with respect to the bowl in such a manner that the helix 5 transports the solids which deposit on the inner wall of bowl 2—the heavier phase of the mixture to be separated—to the other head-end, i.e., to the outlet openings which are provided there, if desired via a conically narrowing drying section, as is known for scroll conveyor centrifuges of the type illustrated.

In the example according to FIGS. 1 to 5, orifices 11 are provided in the bowl housing or in the lid at the level of the bowl housing, so that there can take place, through these orifices 11, primarily a residue discharge from the centrifuge. In addition a periodic thick sludge discharge is possible through such orifices 11. According to FIG. 1, the orifice 11 is provided as its closing element with a control means 12 in the form of a conical valve body which is attached to or formed at the radially outward end of a rod-like actuator 13, which latter is made from a temperature dependent, variable length memory metal rod. The rod shaped actuator 13 is surrounded by and spaced from tube 14 which is heat insulating so that a tube-like space 20 is created between a major portion of the surface of actuator 13 and the inner surface of tube 14 which opens into a tub-shaped annular space 39-19-, in which the outlet opening of a supply pipe terminates which, like inlet tube 9, is stationary and serves for the introduction of a liquid or gaseous heating and/or cooling medium. In the radially outward end of the annular space between actuator 13 and tube 14, there is provided in bowl cover 16 an exit opening 16 for this medium so that, for example, a heating medium supplied through supply pipe 15 flows out and can be,replaced by a cooling medium.

Figure 1:
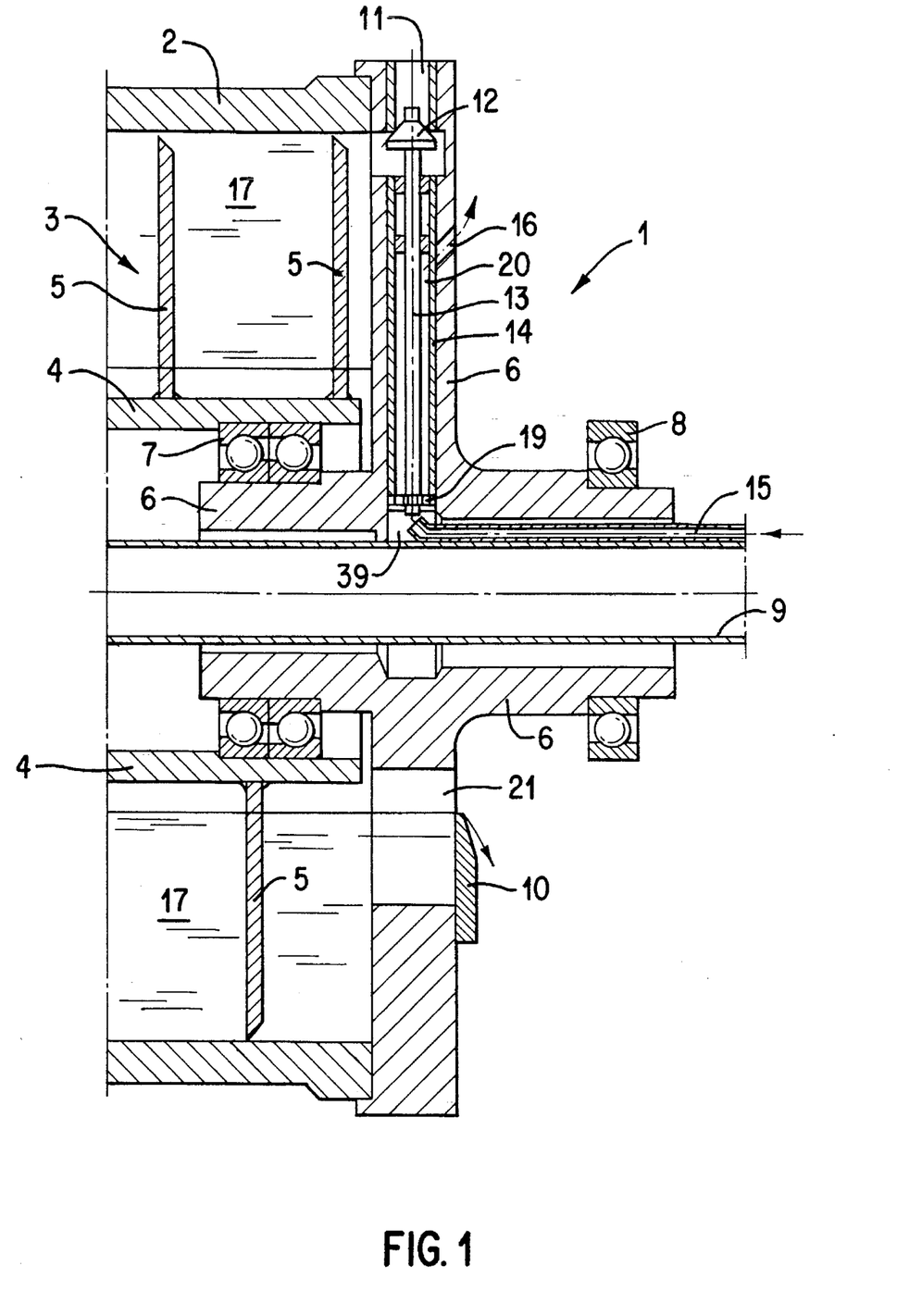

The actuator 13 can be formed of a rod-like memory metal with one-way action or two-way action, in either case in such manner that upon supply of heat and exceeding of the switching temperature—and with it the retransformation of martensite into austenite—there takes place a shortening in the rod's lengthwise direction and the operator 12 moves radially inward away from the mouth of opening 11, so that the liquid remainder present in the separating chamber can escape through nozzle opening 11. When nozzle opening 11 is to be closed again, the heating of the actuator by the heating medium is terminated, or brought back to a low temperature through a cooling medium, under whose influence there can take place a deformation in the lengthwise direction of the rod-like actuator under external forces or with reinforcement of such external forces, which takes place here under the influence of centrifugal force at a predetermined centrifuge rotation rate.

Figure 2:
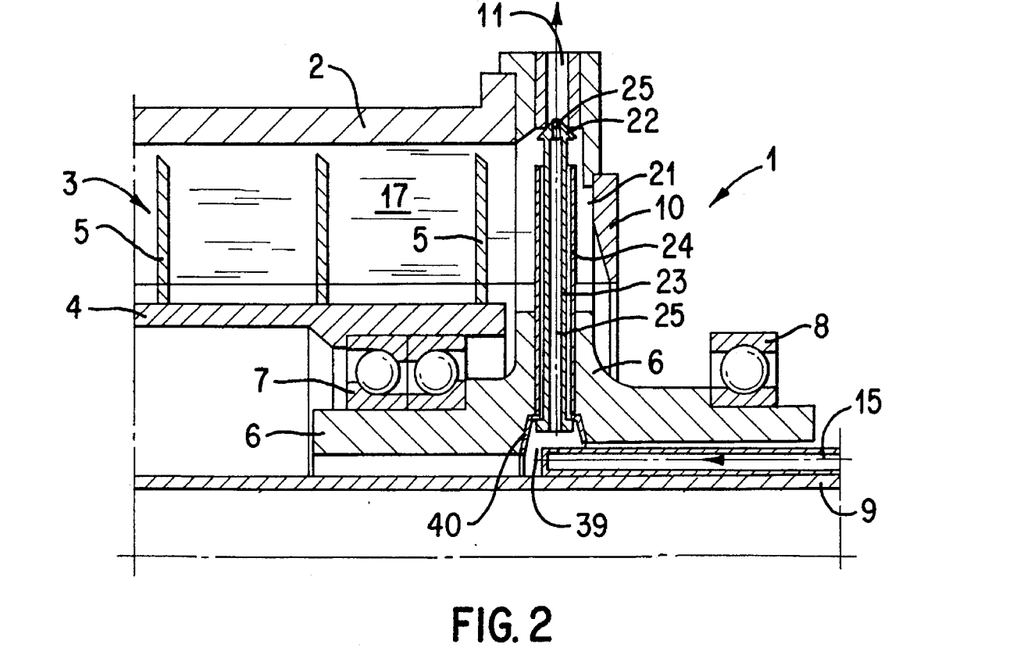
FIGS. 2 to 8 half-sections corresponding to the sectional view of FIG. 1 through embodiments with controllable valve devices.

In the embodiment of FIG. 2 there is a nozzle opening 11 which is similarly attached to the lid at the level of bowl housing 2 and controllable by means of an operator 22 which again takes the form of a conical valve face. This operator is made of one piece with, or else attached to a tube-like actuator 23 made of a memory metal which, during transformation from martensite into austenite structure, undergoes a shortening in its lengthwise direction, i.e. in response to appropriate heating. This actuator 24 is also surrounded by a guide tube 24 and guided lengthwise in the radially outward end of guide tube 24. The hollow space of the actuator 23 terminates in an annular space 39 similar to that in FIG. 1, for example, in which there also terminates the supply pipe 15 for gaseous or liquid heating or cooling medium supplied from outside. Thus the medium flows from tube 25 via the annular space 39 into the rod-like hollow space 26 of tubular actuator 23 and leaves it in the radially outward end portion through an outlet opening 25 which passes axially through the conical valve operator 25, so that the medium can penetrate into orifice 11. The operation is similar to that which was explained in connection with FIG. 2 and also serves the same purposes.

Figure 3:
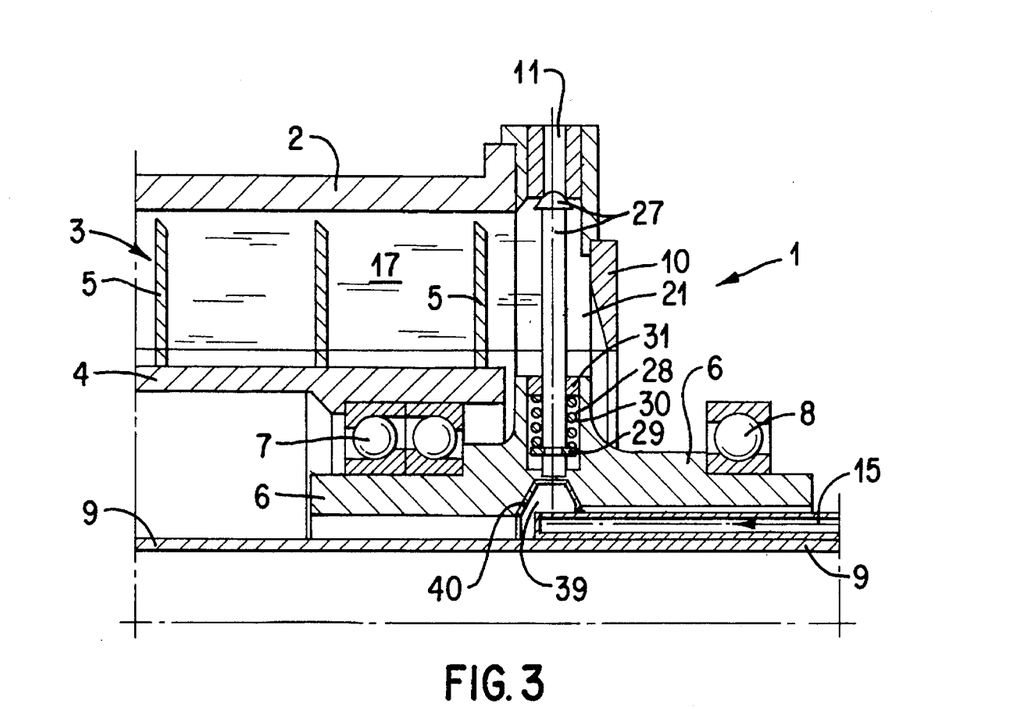

In the embodiment example of FIG. 3, the orifice 11 constructed in the same manner as in FIG. 2 is to be closed and opened by an operator 27 of the conical valve body type, which is attached to a rod extending radially with respect to the rotation axis of the centrifuge, which has at its radially inward end a collar 29—here formed by a snap ring—and which passes with a lot of play through a bushing 31. This bushing 31 is so attached to the hub of the bowl lid 6 that, between it and collar 29, there exists an annular hollow space 28 in which an actuator 30 in the form of a coil spring is mounted. This coil spring-like actuator 30 of memory metal bears against the facing surfaces of collar 29 and bushing 31. Above the hollow space 28, it is in communication with an annular space 39 in which, as in the other examples of embodiments, there terminates the outlet opening of a supply pipe for gaseous or liquid heating or cooling medium. Thus, this cooling medium passes from supply pipe 15 via the annular space 39 into hollow space 28 and exits from the latter into the separating chamber through the annular gap formed by the play between the bushing 31-and the surface of the rod-shaped portion of the operator 27. In its austenitic structure, the memory metal of actuator 30 exhibits a temperature specific shape which is longer in the axial direction of the coil spring configuration than the dimension shown in FIG. 3. Thus, if a heating medium is supplied and the coil spring shaped actuator 30 is thereby heated above the threshold value, so that the martensitic structure changes into austenitic structure, the actuator 30 presses against collar 29 and thereby lifts the actuator away from nozzle opening 11, whereas during cooling—e.g. through supply of a cooling medium—this shape reverts to the state shown in the drawing, with formation of the martensitic structure, due to the centrifugal force which is a function of centrifuge rate of rotation, in which the operator 27 with its cone shaped valve body closes orifice 11. Thus there is described a third embodiment, with operation and mode of utilization as described in connection with FIG. 1.

Figure 4:
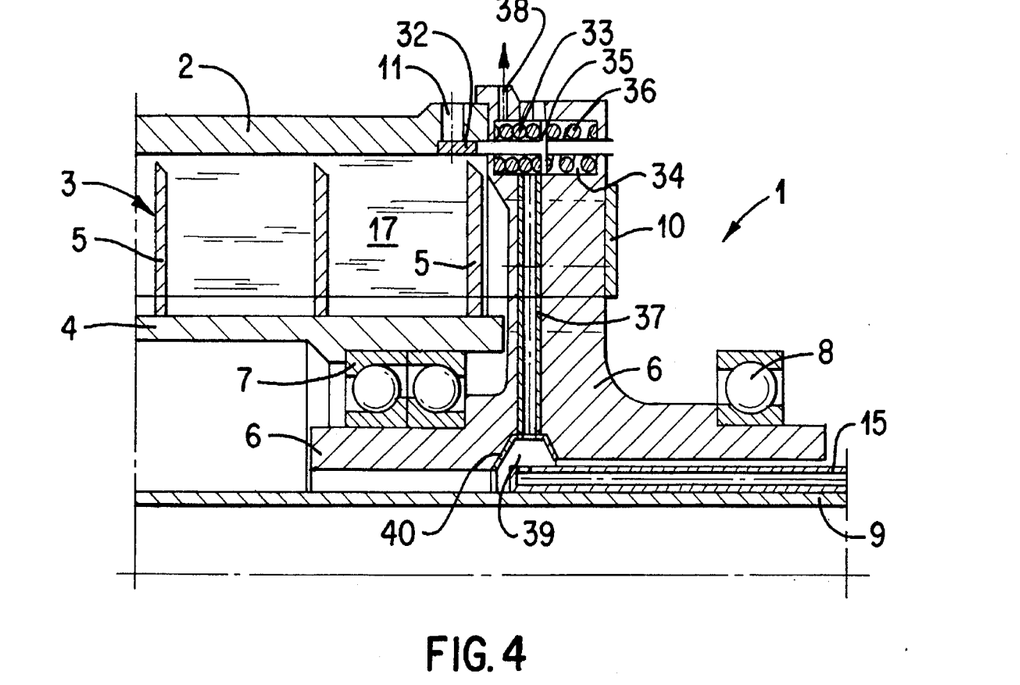

FIG. 4 shows the arrangement of an orifice 11 in the region of the housing of centrifuge bowl 2, whose inlet opening is provided with opening and closing operator 32 in the form of a cylindrical piston whose operating range extends through a hollow space 34 and which exhibits inside the hollow space a cylindrical piston-like slide valve skirt 35. Between the end of hollow space 34 facing the orifice 11 and the confronting face of slide valve skirt 35, there is placed an actuator 33 in the form of a coil spring-shaped memory metal, whereas between the end of hollow space 34 facing away from orifice 11 and the confronting face of slide valve skirt 35 there is inserted a conventional coil spring 36. The portion of hollow space 34 in which the actuator 33 is located, is connected by a radially extending heat insulating supply pipe 37 to an annular space 39 opening into its radially inner end in which—as in the previously treated embodiments—there terminates a stationary supply pipe 15 for gaseous or liquid heating and/or cooling medium. As shown in this exemplary embodiment, with nozzle opening 11 closed by operator 32, the actuator 33 exhibits that shape which it assumes after externally caused deformation through formation of the martensitic structure and which, in terms of its function, can be considered as its starting shape. If the orifice 11 is to be opened, the heating medium is introduced, through pipe 15, annular space 39 and supply pipe 37, into that part of hollow space 34 containing the actuator 33, and from which the heating medium can be removed through an outlet opening 38 leading radially outward. This heats the actuator 33, which stretches through transformation of the martensitic into the austenitic structure in the axial direction of the coil spring shape so as to assume the temperature specific shape prevailing in the austenitic structure. Due to this stretching, the operator 32, which is slidable parallel to the axis of rotation of the centrifuge, is displaced against the force of spring 36 via the slide valve skirt 35, and the orifice 11 is freed up. If the temperature again decreases, as by introduction of a cooling medium over the same path as the heating medium, then below a predetermined temperature threshold, there can take place a reversion into the starting shape illustrated in FIG. 4 under the force of spring 36 and the formation of martensite, so that the operator 32 closes orifice 11. Thus FIG. 4 represents a further embodiment of the operation and applications previously described in connection with FIG. 1.

Figure 5:
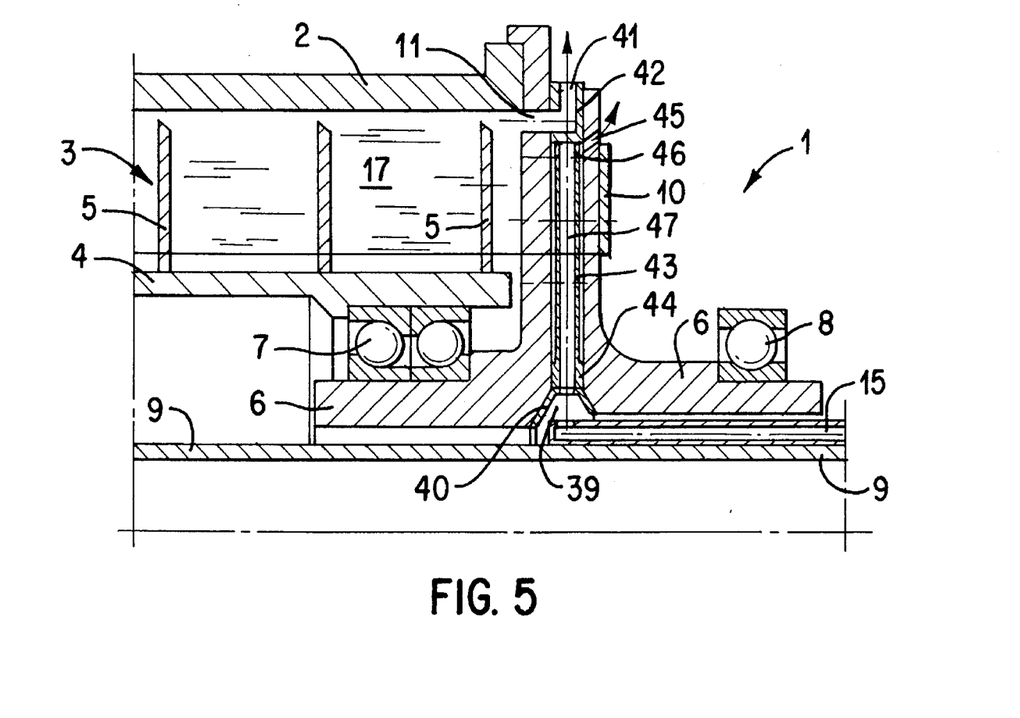

FIG. 5 shows a further variant in which an orifice 11, which extends through bowl lid 6 coaxially with the rotation axis of the centrifuge, has an outlet opening that is opened and closed by an operator 42 in the form of a rotary slide valve. In its open state, the outlet of the orifice 11 terminates in a rotary slide valve outlet 41 and is therefore open for outflow from the separating space. On the other hand, if the operator is rotated around its radially extending longitudinal axis, then the outlet of orifice 11 is closed. This rotation is caused by a tube-like actuator 43 to whose radial end the operator 42 is connected and which takes the form of a hollow torsion bar of memory metal. The actuator 43, made as a hollow torsion bar, has its longitudinal tube axis extending radially and is attached at its radially inner end to bowl lid 6-44-, whereas the radially outer end is freely rotatable and rigidly connected to the rotary valve operator. 42. The rod-shaped hollow space 47 of the tube shaped actuator 43 communicates at its radially inner end with an annular space 39 in which, in previously described manner, there terminates the outlet opening of a supply pipe for gaseous or liquid cooling or heating medium. The walls of annular space 39 are provided with heat insulation 40—as in the other embodiments—in order to prevent too high a heat flow in the hub region of bowl lid 6. At its radially outward end, the rod shaped hollow space 47 of actuator 43 is in communication, via an austenitic temperature-specific opening 46, with an outlet opening 45, which is slit-shaped or which operates via an annular space, so that the heating or cooling medium can be removed from the hollow space. In the illustrated embodiment the actuator is in its austenitic temperature-specific shape, in which liquid can be removed from the separating chamber through orifice 11 and the rotary valve exit 41. If this is to be prevented, then cooling medium is supplied through supply pipe 15, annular space 39 and rod-like hollow space 47 of actuator 43, or else one waits for appropriate cooling, whereupon after falling below a predetermined temperature threshold and if appropriate with the assistance of a torsion spring (not shown), which makes a torsional movement that is transmitted to the operator 42, the memory metal of actuator 43 switches into its starting shape. This leads to a rotation of operator 42 such that the exit from orifice 11 is closed. Upon raising of the temperature, or supply of an appropriate heating medium, the actuator 43 in the form of a hollow torsion rod again assumes its temperature determined shape in which, as shown in FIG. 5, the orifice is in communication with the rotary valve exit 41. The torsion rod could also consist of two segments connected radially to each other, one of which assumes its temperature specific shape during a first, low heating, while the other segment assumes its temperature specific shape at the higher temperature, the arrangement being so constructed that, upon reaching of the first heat threshold, the orifice 11 is closed and upon reaching of the second threshold value the same is reopened. As far as applications, reference is made to the details given for the prior embodiment examples.

Figure 6:
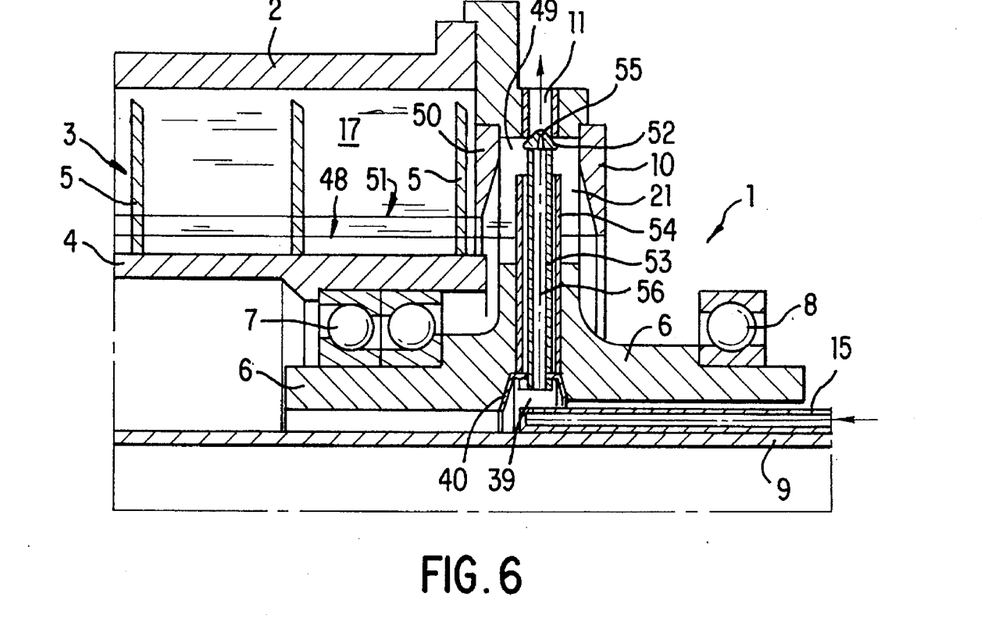

The exemplary embodiment according to FIG. 6 shows, in addition to the provision of an axially external sill 10 with a relatively small internal diameter, an additional sill 50 located in the region of bowl lid 6 axially inside the centrifuge and with a larger internal diameter 51. In the region between the two sills 10 and 50, there is a hollow space 49 which, relative to the outer sill 10, is comparable to discharge openings 21. This hollow space terminates in an orifice 11 in a housing segment of bowl lid 11. This orifice is connected as the opening and closing device for an operator 52 in the form of a valve body, which is connected to a radially extending tube-shaped actuator 53 of memory metal that extends through and is spaced from a guide tube 54. The rod-like hollow space 56 of actuator 53 serves to pass, via a stationary supply pipe 15 and an annular space in previously described manner, heating or cooling medium which leaves the rod-shaped hollow space 56 at its radially outward end through an outlet opening 55 which is positioned axially in the cone-shaped operator 52, so that this medium can be removed through the orifice 11. The operation of the actuator and the operator is the same as described in connection with FIG. 2. Through the use of actuator 53 and with it the operator 52 which is to be opened and to be closed, it is possible to determine whether the depth of the pool 17 in the separating chamber of the centrifuge is controlled by the smaller inner diameter 48 of sill 10—orifice 11 is closed, liquid is removed over sill 10—or by the larger diameter of sill 50—orifice 11 is open, the liquid is removed from the separating chamber over sill 50 and through orifice 11.

Figure 7:
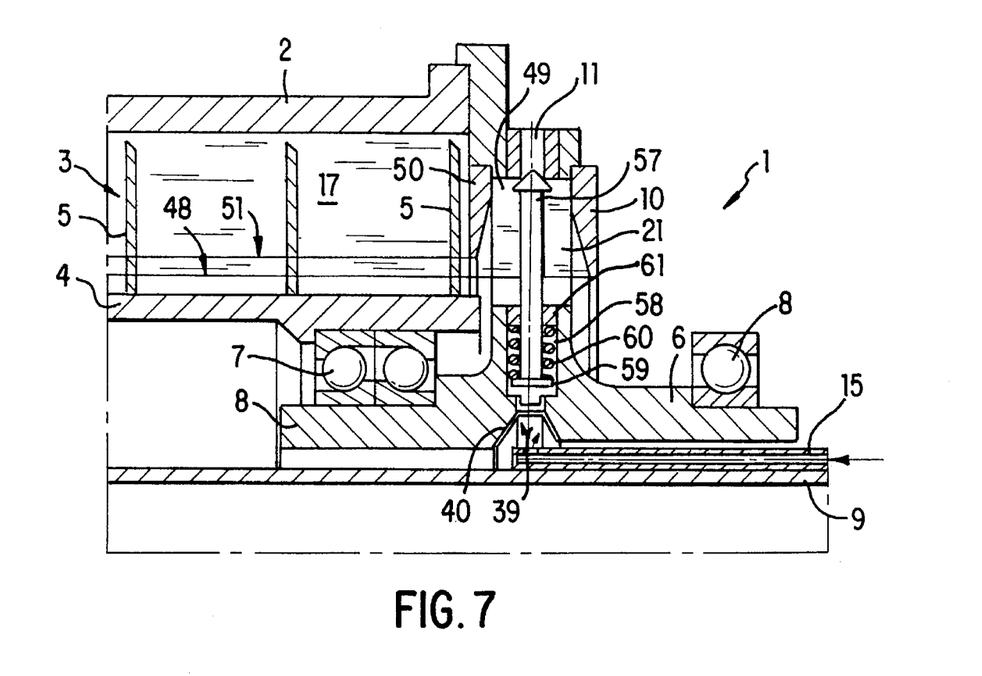

In FIG. 7 there is illustrated another embodiment for the mode of operation, or the kind of use described with reference to the example according to FIG. 6. Here, the orifice is provided with a valve body shaped operator 57 which terminates in a rod shaped operating member that passes through a hollow space 58 and exhibits a collar 59 at its radially inward end. The rod shaped operating member extends radially further outward through an annular support 61 which is fixedly attached to the bowl lid. In the hollow space 58 which is formed between collar 59 and annular support 61, there is a coil spring shaped actuator 60 of memory metal, whose control and with it the operation of the valve corresponds to that which was described in connection with the exemplary embodiment according to FIG. 3.

Figure 8:
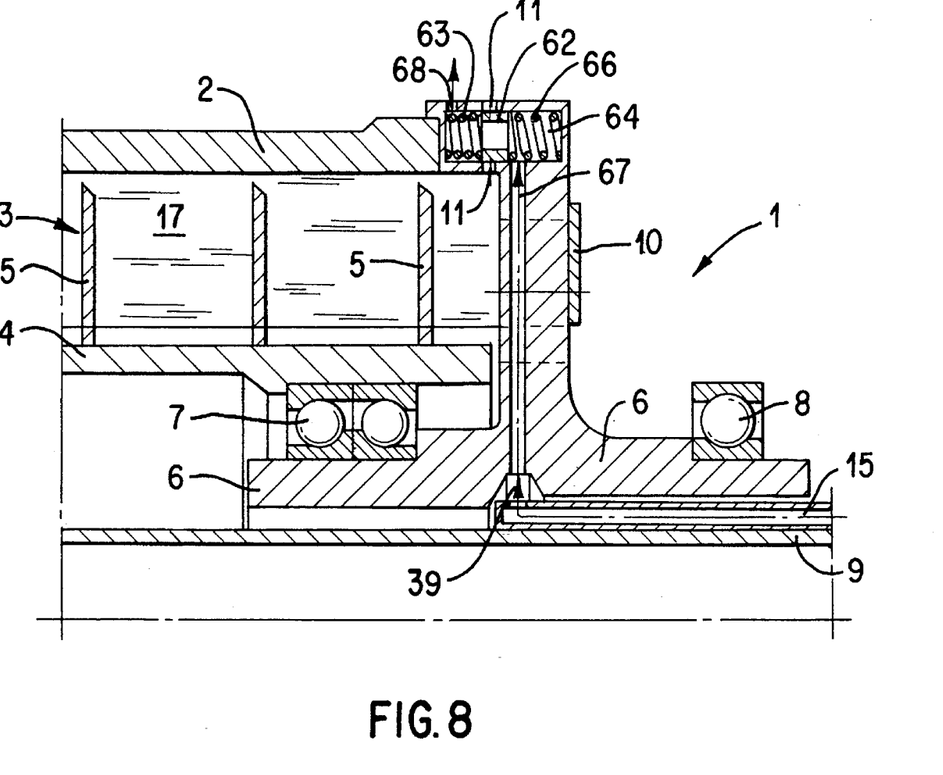

In FIG. 8, there is provided for a similar purpose an arrangement which is controllable in a manner similar to FIG. 4. There, operator 62 for the orifice 11 which is provided at the level of bowl housing 2 in bowl lid 8 is not in the form of a slide valve but is in the form of a hollow cylindrical piston which is slidably located in a hollow space 64 parallel to the centrifuge axis of rotation. Between the end surface of hollow space 64 adjacent the bowl housing 2 and its confronting end face of operator 62, there is located the actuator 63 in the form of a coil spring-like memory metal, whereas between the end face of hollow space 64, which faces away from bowl sidewall 2, and its confronting face of operator 62, there is located a conventional coil spring 66. In the hollow space 64, there terminates a radially extending channel 67 for supply of the heating medium which ends in an annular space 39 that communicates with the outlet opening of a supply pipe 15 in previously described manner, so that gaseous or liquid heating medium reaches the hollow space 64 and, through the hollow in the cylindrical piston shaped operator 62 reaches the location of actuator 63 from where it can be removed through an outlet opening 68. The control of the actuator 33 and with it the setting of the annular piston shaped operator 62 takes place in a fashion similar to that described in connection With FIG. 4. The intended application is also similar to the explanations given with respect to FIG. 1. For cooling the actuator there is used the centrifuged material which exits through aperture 11.

Figure 9:
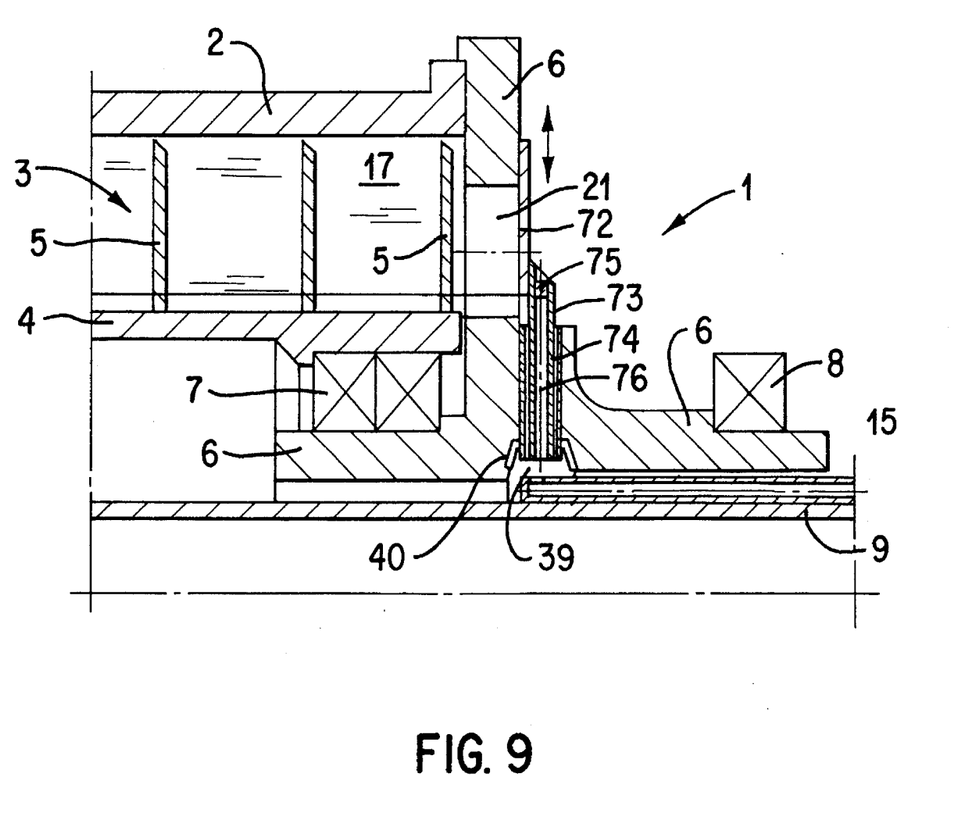
FIG. 9 a half-section corresponding to the section of FIG. 1 with a sill plate adjusting device.

In FIG. 9, the sill which is associated with the discharge openings 21 for the liquid phase of the mixture to be separated is subdivided into separate sill plates 72, which are radially slidable relative to bowl lid 6. The sill plates 72 are respectively engaged by the radially outer end of one of the actuators 73 which are tube shaped and variable in length due to memory metal action. This actuator is supported radially inwardly by bowl lid 6 and surrounded by a supply pipe 74. In the radially outer region of the hollow space of tube-like actuator 73 which serves as control medium channel 76, there is provided a relatively narrow outlet opening 75, through which the heating or cooling medium that flows through the control medium channel 76 via supply pipe 15 and annular space 39 can be removed. When heating medium is supplied and a transformation from martensite into austenite takes place, the tube shaped actuator 73 becomes shorter so that the corresponding sill plate becomes displaced radially inward. Upon falling below the transformation temperature, i.e. by supply of an appropriate cooling medium, this temperature specific shape of the austenite structure is again relinquished, so that, under centrifugal force or a shock absorber spring (not shown) the tube again radially lengthens, whereby the sill plate assumes a greater inner diameter. In this way it is possible to specifically regulate from outside the depth of pool 17 in the separating chamber of the centrifuge as a function of temperature. Here, too, stepwise occurring changes are possible through appropriate series or parallel connection of memory metals. If the operation with large sill diameter is to take place only briefly then, for that purpose, the actuator 73 is supplied with cooling medium, while the remaining operation transforms the memory metal into the austenitic temperature specific shape due to the then prevailing operating temperature, thereby reducing the sill diameter.

Figure 10:
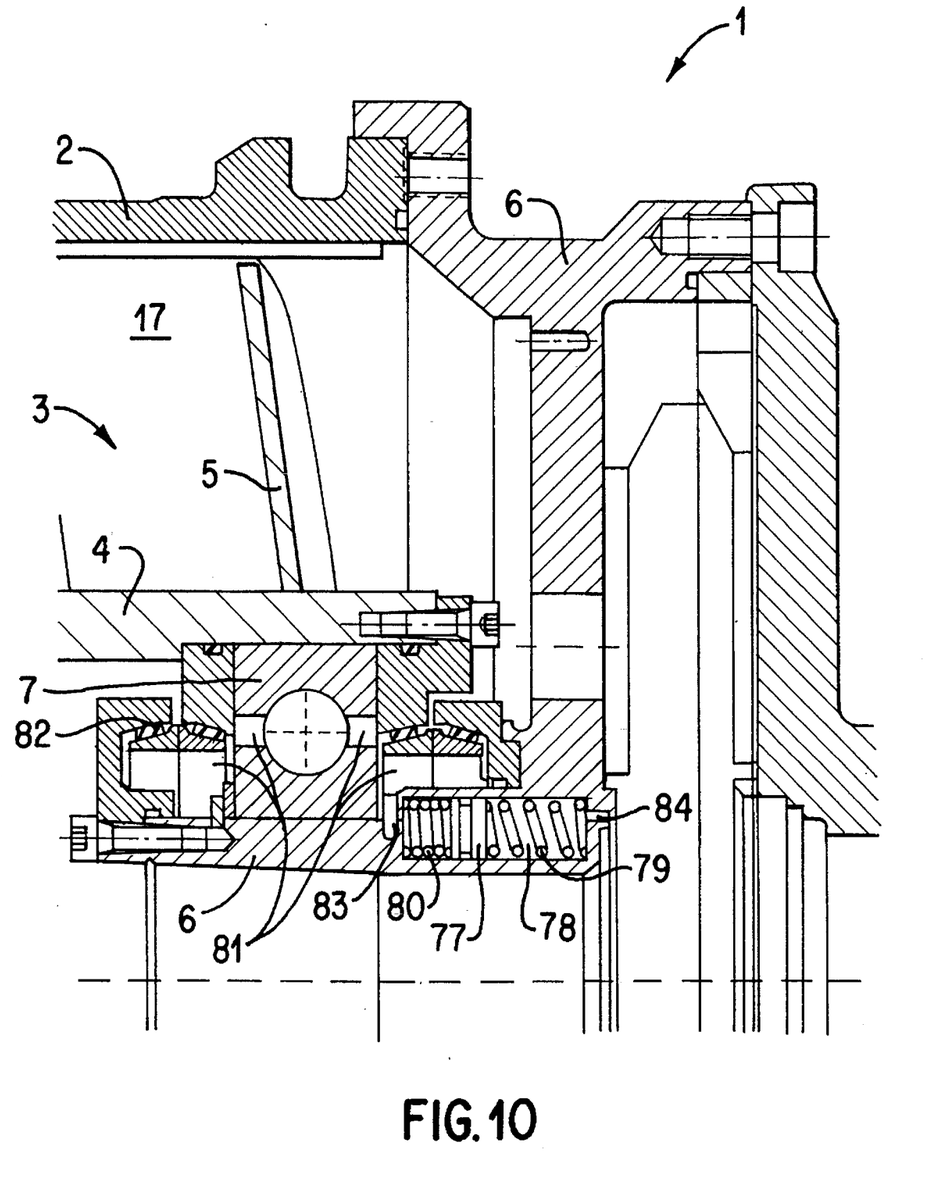
FIG. 10 a half-section corresponding to the section of FIG. 1 for the volume adjustment of the lubricant space of a helix bearing.

The exemplary embodiment according to FIG. 10 shows the application of an actuator 80 made of a coil spring shaped memory metal for relieving the lubricant pressure during increasing heating and the accompanying changing volume and viscosity of the lubricant. The lubricant space 81 of helix bearing 7 is provided with seals 82 and terminates - 83 - in a hollow space 78 serving as compensating chamber in which there is located a piston shaped operator slidable parallel to the axis of rotation of the centrifuge. The coil spring, shaped actuator 80 is located in the region of hollow space 78 adjacent to lubricant space 81, i.e. between the end face of hollow space 78 facing the lubricant space and the opposing end face of the piston. The remaining hollow space portion facing away from that space serves to receive a mechanical coil spring and is provided with exhaust opening 84. The actuator 80 serves here as sensor for the lubricant temperature, in such a manner that upon exceeding a predetermined threshold and with it a transformation of the martensitic into the austenitic structure, there takes place an increase of the coil spring shaped memory metal in the lengthwise direction of its coil shape, whereupon the piston shaped operator 77 is displaced against the force of the restoring coil spring, so that the space which is available for the lubricant also becomes larger. Upon falling of the temperature and martensite formation which this makes possible, the restoring coil spring .79 again displaces the piston 77 in the direction of a shortening of the coil spring shaped memory metal, so that the hollow space for the lubricant again becomes smaller. In this manner one insures that a predetermined temperature of the lubricant must first be reached before an enlargement of the lubricant space takes place, so that the lubricant which is then more fluid and expanding does not overload the seals and create leakage. The displacement of the piston can take place step-wise through appropriate series or parallel connections of memory metals, as previously explained in the course of the above-mentioned exemplary embodiments. Basically it would also be possible to connect several pistons in parallel and to equip them with memory metals having different temperature change values.

The exemplary embodiments previously discussed and illustrated in the drawings disclose only in part the use of force storage means, or springs, which cooperate in one way or another with a memory metal. In some or all of these examples there can be provided force storage means, or springs which urge the memory metals toward their starting shape, in order to ensure the durability of the shape changing capability. This is advisable whenever the forces which arise to reinforce the restoration to the starting shape are inadequate for continuous operation, or are not reliably permanent.

I claim:

1. Centrifuge for separating substances comprising:
    at least one operable device rotatably located in a rotating region of the centrifuge, controlled by at least one co-rotating mechanical actuator for determining the operation of said at least one device, in which the actuator exhibits a shape change, resulting in at least one temperature specific configuration which is controlled by heating and/or cooling, and the actuator is bathed in a liquid or gaseous heating and/or cooling control medium to provide the temperature variation which causes the actuator shape change.

2. Centrifuge according to claim 1, wherein the temperature variation needed to cause the shape change of the actuator is smaller than the temperature range provided by said heating and/or cooling, so that the shape change takes place suddenly.

3. Centrifuge according to claim 1, wherein at least one of the actuators is formed from a memory metal.

4. Centrifuge according to claim 3, wherein the shape change of the memory metal involves a transformation from the martensitic to the austenitic state resulting in movement in one direction, or a reversion into the martensitic state resulting in return movement, and the movement in the one direction takes place against the centrifugal force exerted by the centrifuge during rotation, while the return movement takes place with centrifugal force reinforcement.

5. Centrifuge according to claim 3, wherein the direction of movement of at least one of the actuators, upon transformation of the actuator of memory metal from the martensitic into the austenitic state is against the force of a return spring while the return movement upon reversion of the actuator into the martensitic state takes place with spring force reinforcement.

6. Centrifuge according to claim 5, wherein at least one of the actuators of memory metal is a pull rod, a torsion bar, or a bending member.

7. Centrifuge according to claim 5, wherein at least one of the actuators is also the sensor for temperatures established by the centrifuge and/or the substances in the centrifuge.

8. Centrifuge according to claim 7, wherein the temperature change of at least one of the actuators takes place upon introduction of cleaning liquid after prior operation with cold centrifuged medium.

9. Centrifuge according to claim 7, wherein the temperature change of at least one of the at least one actuator takes place through contact with outflowing centrifuged medium.

10. Centrifuge according to claim 7, wherein the centrifuge includes a helix having a bearing space filled with lubricant and constituting a pressure equalization chamber, or being in communication with such a chamber, whose internal volume is adapted to be enlarged by means of at least one of said actuator in contact with the lubricant in response to the lubricant temperature rise, by means of at least one piston guided within a hollow space, said piston having at one end a face exposed to the lubricant at which there is positioned the actuator constituted of at least one coil spring shaped memory metal and said distort having at its opposite end a face against which there bears a restoring spring.

11. Centrifuge according to claim 1, wherein at least one of the actuators exhibits a repeatable shape change effect, changing from an initially stable configuration through cyclic heating and cooling into a different configuration and reverting into the initial configuration.

12. Centrifuge according to claim 1, wherein at least one of the actuators is formed of two or more memory metals arranged in parallel and/or in series.

13. Centrifuge according to claim 1, wherein at least one of the actuators is formed of two or more memory metals connected to each other, positioned in series and/or parallel and having shape changes which oppose each other in response to temperature responsive phase change.

14. Centrifuge according to claim 1, wherein at least one of the controlled devices is a regulating means for opening and closing a nozzle opening, to which regulating means the at least one actuator is connected.

15. Centrifuge according to claim 14, wherein the centrifuge has a bowl having a radially outward region containing the nozzle opening and so arranged that the centrifuge bowl is adapted to be emptied through this nozzle opening.

16. Centrifuge according to claim 14, wherein the centrifuge has a bowl having a region for containing thick sludge, and the nozzle opening is located in the thick sludge region and is so arranged that the thick sludge is adapted to periodically be emptied from the centrifuge bowl through this nozzle opening.

17. Centrifuge according to claim 14, wherein the centrifuge bowl contains an overflow sill and the nozzle opening is located at a larger diameter than the overflow sill, so that when the nozzle opening is open there is established an inner diameter of the liquid level which is greater than the inner diameter determined by the overflow sill.

18. Centrifuge according to claim 14, wherein the centrifuge bowl contains a separating chamber and two spaced-apart sill plates, the sill plate facing the separating chamber having a larger inner diameter than the other sill plate, so that when the nozzle opening is opened the inner liquid diameter is determined by the sill plate with the larger inner diameter and when the nozzle opening is closed, it is determined by the sill plate with the smaller inner diameter.

19. Centrifuge according to claim 1, wherein at least one of the actuators consists of a rod or hollow rod whose length is variable as a function of temperature, and is connected to a sill plate which is radially slidable with respect to a discharge opening.

20. Centrifuge according to claim 1, which is a scroll conveyor centrifuge.

21. Centrifuge according to claim 1, which is a drum centrifuge.

22. Centrifuge according to claim 1, which comprises a spring which provides the force which makes the at least one actuator assume its respective initial configuration.

* * * * *